Feb. 1, 1955 F. C. EVERETT 2,701,339
TRANSMISSION LINE FILTER
Filed May 1, 1951
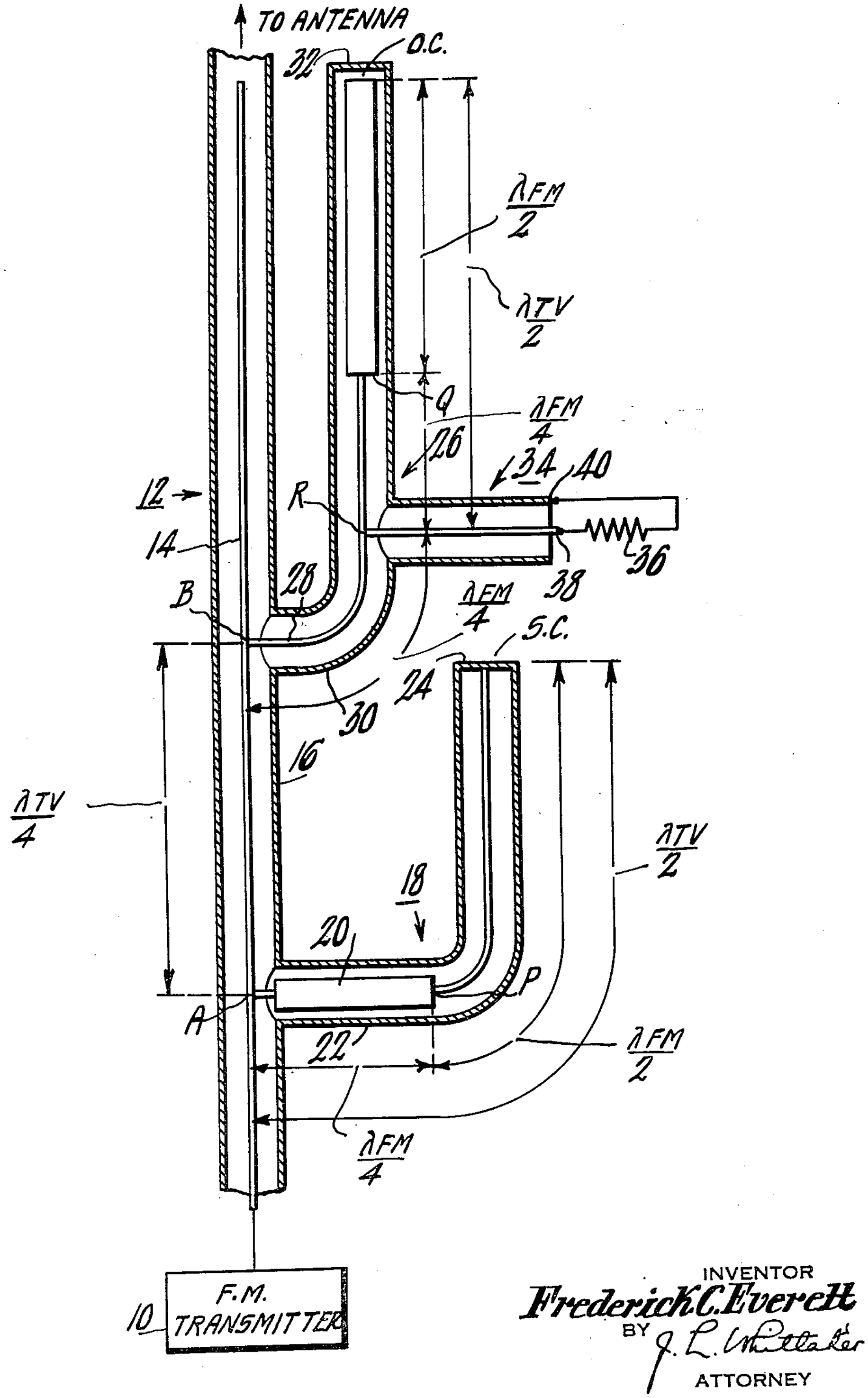
INVENTOR
Frederick C. Everett
BY J. L. Whittaker
ATTORNEY United States Patent Office 2,701,339

Patented Feb. 1, 1955

2,701,339

TRANSMISSION LINE FILTER

Frederick C. Everett, Rockville Centre, N. Y., assignor to Radio Corporation of America, a corporation of Delaware Application May 1, 1951, Serial No. 223,953

4 Claims. (Cl. 333—9)

The present invention is related to transmission lines, and more particularly to a filter arrangement for transmission lines.

It is sometimes desirable to have a filter arrangement which allows the passage of electrical energy at one operating frequency along a transmission line, but prevents passage of energy at a different operating frequency. For example, in transmitting television (TV) and frequency modulated (FM) signals from the same antenna, or on a single transmission line, a filter arrangement may be connected in a line section between the FM transmitter and the point where the TV transmitter connects to the line. The filter arrangement allows free passage of energy from the FM transmitter along the line section, but prevents energy at the TV frequency from passing through the line section to the FM transmitter. These filters are especially desirable where long line lengths in terms of wavelength exist between the FM transmitter along the main transmission line and the point at which the TV transmitter is connected, and vice versa. To prevent frequency sensitivity, then, the filter is desirably arranged to present near the generator the frequency of which is passed a fixed and always matched termination to that frequency which it blocks. Otherwise, due to the fact that the transmitter at one frequency is not a fixed termination for energy at the other frequency, reflections occur which are undesirable. Available space is also sometimes at a premium in installations such as those being considered. Accordingly, compactness is also desirable. By proper connection of the two transmitters, a filter arrangement of the type described can be employed as a diplexer, energy at each frequency being prevented from passage to the transmitter operating at the other.

It is an object of the present invention to provide a novel filter arrangement of the kind which freely passes one frequency in one direction along a line section and prevents passage of a different frequency in the reverse direction.

Another object of the invention is to provide a filter of the type described more compact than prior filters.

A further object of the invention is to provide means freely passing energy of one frequency in one direction along a line section, and yet providing a matched termination for frequency incident in the reverse direction.

In accordance with the invention, a branch line of a main line section is terminated in a pure reactance at one end either by open or short circuit. At a point an integral number of quarter wavelengths at one frequency distant from this one end, the characteristic impedance of the line is changed. By this means, a point a greater number of quarter wavelengths distant at the one frequency is made to appear electrically as also an integral number of quarter wavelengths distant at another frequency from the one end point. Therefore, at a single point on the line, the line stub or branch line section appears electrically as a pure reactance at both frequencies, even though as measured by free-space wavelengths the integral number of quarter wavelengths distant at one frequency is not equal to the integral number of quarter wavelengths at the other frequency. Heretofore, this result has required the appendage of T stubs or other lumped terminations on the line stub end. It is a feature of the present invention that the omission of such lumped terminations and the use instead of a simple open or short circuit in the branches from the main line section affords a greater degree of compactness, and greater ease of construction and adjustment than the prior filters of this type.

As an example, at one TV frequency of 68 mc./s. (megacycles per second) a half free-space wavelength is nearly equal to three-fourths of a free-space wavelength at an FM frequency of 97.1 mc./s. By applying the invention to frequencies where an integral number of half wavelengths of one differs by only a small amount (by which is meant a tenth of the smaller wavelength or less) of the other, the change in characteristic impedance required falls within easily practical limits. Further according to the invention, a short-circuited stub of a length of three-fourths wavelength at FM is connected to a main line section. The stub is stepped at a point a half wavelength at FM from its short-circuited end so that at its point of connection to the main line section a further quarter wavelength from the short-circuited end, it appears as an open circuit at FM and a short-circuit at TV. A similar stub is connected by a connector of a quarter wavelength at FM to the main line at a point a quarter wavelength at TV on the main line section more distant from the FM transmitter than the point of connection of the first stub. A branched termination matched at TV is connected at the point where the second stub is connected to the connector. Energy from the transmitter at FM sees only an open-circuit shunt at the point of connection of the first stub. Similarly, it sees only an open-circuit shunt at the point on the main line section of connection of the connector, and therefore, passes unimpeded along the main line section. Energy of the TV frequency incident on the main line section in the other direction travelling toward the FM transmitter, sees first at the point of connection of the connector to the main line section, looking toward the FM transmitter, an open-circuit, and therefore passes along the connector. At its point of connection to the stub, again it sees an open-circuit, and therefore passes into the matched termination.

The foregoing and other objects, advantages, and novel features of the invention will be more apparent from the following description when taken in connection with the accompanying drawing, the sole figure of which is a longitudinal cross-sectional view of one embodiment of the invention.

Referring to the drawing, an FM transmitter 10 is connected through a section 12 of coaxial line to an antenna. The FM operating frequency may be, by way of example, 97.1 mc./s. The antenna is also supplied with energy by a TV transmitter (not shown) at a point more remote from FM transmitter 10 on the main transmission line than line section 12. The TV transmitter operating frequency may be, by way of example, 68 mc./s. The main line section 12 has an inner conductor 14 and an outer conductor 16. At a point A, a stub 18 is connected in shunt to main line section 12 by connection of the stub inner conductor 20 to main line section inner conductor 14 and connection of the stub outer conductor 22 to the main line section outer conductor 16. The stub 18 is short-circuited at the end remote from the point A by connection of its inner conductor 20 to an end plate 24 terminating the stub outer conductor. At a point P a half wavelength electrically at FM from the short-circuited end of stub 18, the characteristic impedance of the line is changed by an abrupt change in the inner conductor dimensions. The stub length is thereby made electrically three-fourths wavelength at FM and one-half wavelength at TV.

A second stub 26 is connected in shunt to the main line section 12 at point B by connection of the second stub inner conductor 28 to the main line section inner conductor 14 and the second stub outer conductor 30 to the main line section outer conductor 16. At the end remote from its point of connection B, the second stub is open-circuited, for example as shown by terminating its inner conductor 28 just short of an end plate 32 closing the outer conductor 30. At the point Q on the open-circuited stub a half wavelength at FM distant from the open-circuited end, the inner conductor is abruptly stepped. This step is so made that the point R, which is three-fourths wavelengths electrically at FM distant from the open-circuited end of the stub 26 is also a half wavelength electrically at TV distant from the open-circuited end. It is clear that if desired the stub line from R to the open-circuited end may be considered an open-circuited stub, and that the line from R to B may be considered simply as a connector. At point R is provided a branch connection by a branch transmission line 34. The branch line 34 is preferably terminated, as by a resistor 36 or energy absorptive material, in its own characteristic impedance. The branch line 34 has its inner conductor 38 connected to open-circuited stub inner conductor 28 and has its outer conductor 40 connected to the open-circuited stub outer conductor 30. The branch line 34 is matched to the line connector (the open-circuited stub 26 portion from B to R) at least at the TV frequency.

In operation, the FM energy from transmitter 10 passes along main line section 12 in the direction of point A. At point A, the shunt connected short-circuited stub presents to this energy an open-circuit, because the distance to the short-circuited end at FM frequencies is electrically an odd number of quarter wavelengths. Therefore, the FM energy continues along main line section 12 toward point B. At point B, the shunt impedance presented by the connector and open-circuited stub is an even number of quarter wavelengths at FM, or an integral number of half wavelengths. Hence, the FM energy continues along the main line section 12 toward the antenna. None of the energy is diverted into the stub connections.

At TV frequencies, energy travelling in the direction from the antenna toward the FM transmitter 10 along the main line section 12, at point B, looking down the main line section 12 toward FM transmitter 10, sees at point A a short-circuit in shunt across main line section 12. This short-circuit is due to the short-circuit at the end of the short-circuited stub which is electrically a half wavelength at the TV frequency distant from point A. The point A, however, is a quarter wavelength distant at the TV frequency from the point B. Therefore, at point B the TV energy sees an open-circuit along the main line section 12 and is constrained to travel on the connector line section from point B toward point R. At point R, looking toward the end of the open-circuited stub, the FM energy again sees an open-circuit, since the open-circuit is a half wavelength at the TV frequency distant from point R. Therefore, the TV energy enters the branch connected line 34, which is matched at the TV frequency, and the TV energy is absorbed in the matching resistive termination 36. Thus any energy at the TV frequency which, due to slight mismatch or other reasons, travels toward the FM transmitter 10 along the main line, is absorbed and never reaches the FM transmitter 10 to cause any difficulty. In other words, the main line section 10 appears to TV energy as a matched termination fixed in value.

With coaxial line sections, and with these frequencies selected above as illustrative, the stepped changes of the line sections may be calculated in two manners. Consider first the short-circuited stub 18. The distance from the short-circuit to point P is taken as $\lambda_{FM/2}$, where $\lambda_{FM}$ is a wavelength at the FM frequency. As the point P is an integral number of quarter wavelengths distant from the short-circuited end, FM energy there always sees a pure reactance, in this instance at a half wavelength at FM, it sees a short-circuit, no matter how the line is stepped at the point P. This length of line at TV frequencies is about 126°. The length of line from A to P is $\lambda_{MF/4}$ or about 63° at TV. But the total length of the short-circuited stub from the short-circuited end to A is to be $\lambda_{TV/2}$ where $\lambda_{TV}$ is a wavelength at the TV frequency. Therefore, the impedance at P looking toward the short-circuit end must be $Z_1$ tan 126°, where $Z_1$ is the characteristic impedance of this length of line. The imaginary $j$ factor is omitted. Also, the impedance at P looking toward the short-circuit s. c., may be expressed in terms of the impedance at A looking toward P and s. c. This last impedance is to be a short-circuit, and it may be expressed as $Z_2$ tan 63° where $Z_2$ is the characteristic impedance of the line from A to P. Therefore, (1) $$Z_2 \tan 63° = Z_1 \tan 126°$$

and (2) $$Z_2/Z_1 = \frac{\tan 126°}{\tan 63°}$$

If $Z_1$ is taken as 51.5 ohms, $Z_2$ is about 36 ohms.

The second manner of calculating the relative characteristic impedances is by the use of an impedance chart such as that shown by Phillip H. Smith in an article entitled "Transmission line calculator," in Electronics, January 1939, or a like article in the issue for January 1944. These charts are familiar to electrical engineers, and show one half wavelength (180° electrically) laid out on the circumference of a circle, and impedance factor lines terminating at the circle circumference. This description suffices for the present purpose. Starting at the short-circuit point on the chart, one goes clockwise (wavelengths toward generator) 163° representing the shift of line from the s. c. point to point P. Here one may read the factor 1.4. Assume a line between P and s. c. of characteristic impedance 51.5, the impedance at P looking toward s. c. is 51.5 (1.4). Starting on the chart at the short-circuit point (representing the desired impedance at A), one goes counterclockwise (wavelengths away from the load) 63°. Here one reads the factor 1.9. If $Z_2$ is the characteristic impedance from A to P, in order to fulfill the desired conditions, (3) $$Z_2\ (1.9) = 51.5\ (1.4)$$

and (4) $$Z_2 = 36 \text{ ohms approx.}$$

In actual practice it was found that with $Z_1$=51.5 ohms, $Z_2$=34.8 ohms worked very well. The manner in which similar computations may be made for the open-circuited stub 26 should now be clear from the description of the computations from the short-circuited stub 18. The branch connection 34 and main line section 12 has characteristic impedances of 51.5 ohms. This same characteristic impedance was also chosen for the line lengths from P to s. c. and B to Q for reasons of uniformity and availability.

It is preferred to fold or bend the stubs to be parallel with the main line section, thus making the filter arrangement especially compact.

It is readily shown that the resistor 36 could be replaced by a TV transmitter (not shown) and with an antenna connected to the main line section 12 at its end remote from FM transmitter 10, the antenna would receive energy from each transmitter without either transmitter feeding energy into the other which feed-through might cause undesired reflections.

It will be apparent that there is disclosed herein a compact, novel filter arrangement which may be used for diplexing or as a filter to prevent feedback along a transmission line of energy of one frequency to a transmitter operating at a different frequency.

What is claimed is:

1. A transmission line filter arrangement for transferring energy from a source of radio frequency energy of operating free-space wavelength $\lambda_2$ to a load having a connection for receiving energy from a second source of radio frequency energy of free-space operating wavelength $\lambda_1$ which is not harmonically related to $\lambda_2$, comprising a main transmission line section having at one end means for connection to said source of wave-length $\lambda_2$ and at the other end having means for connection to a load, a short-circuited stub connected at one end to said line section intermediate said line section ends and short-circuited at the other stub end, said short-circuited stub having an effective electrical length $n_2\lambda_2/4$, where $n_2$ is an odd multiple (including unity) and also an effective electrical length $n_1\lambda_1/2$, where $n_1$ is an integral (including unity) by virtue of a change in its dimensions and therefore its characteristic impedance along its length, the physical length $n_2\lambda_2/4$ being unequal to $n_1\lambda_1/2$, an open-circuited stub connected at one end to said line section intermediate said line section ends and at a point on said line section electrically an odd multiple (including one) quarter wavelengths $\lambda_1$ distant in the direction toward said load from the point of connection of the said short-circuited stub, said open-circuited stub having at its other said end an open-circuit, a branch connection point on said open-circuited stub at a point electrically an odd multiple (including unity) of quarter wavelengths $\lambda_2$ from the said one end point of connection to said line section, said open-circuited stub having a length from the said point of branch connection to its open-circuited end electrically $$\frac{n_2\lambda_2}{4}$$

and also electrically $$\frac{n_1\lambda_1}{2}$$

by virtue of a change in its dimensions and therefore its characteristic impedance along its length, and a branch line connected at one end to said branch connection point and terminated at the other end in its characteristic impedance.

2. A transmission line filter arrangement for transferring energy from a source of radio frequency energy of operating free-space wavelength $\lambda_2$ to a load having a connection for receiving energy from a second source of radio frequency energy of free-space operating wavelength $\lambda_1$ which is not harmonically related to $\lambda_2$, comprising a main transmission line section having at one end means for connection to said source of wavelength $\lambda_2$ and at the other end having means for connection to a load, a short-circuited stub connected at one end to said line section intermediate said line section ends and short-circuited at the other stub end, said short-circuited stub having an effective electrical length $n_2\lambda_2/4$, where $n_2$ is an odd multiple (including unity) and also an effective electrical length $n_1\lambda_1/2$, where $n_1$ is an integral (including unity) by virtue of a change in its dimensions and therefore its characteristic impedance along its length, the physical length $n_2\lambda_2/4$ being unequal to $n_1\lambda_1/2$, an open-circuited stub connected at one end to said line section intermediate said line section ends and at a point on said line section electrically an odd multiple (including one) quarter wavelengths $\lambda_1$ distant in the direction toward said load from the point of connection of the said short-circuited stub, said open-circuited stub having at its other said end an open-circuit, a branch connection point on said open-circuited stub at a point electrically an odd multiple (including unity) of quarter wavelengths $\lambda_2$ from the said one end point of connection to said line section, said open-circuited stub having a length from the said point of branch connection to its open-circuited end electrically $n_2\lambda_2/4$ and also electrically $n_1\lambda_1/2$ by virtue of a change in its dimensions and therefore its characteristic impedance along its length, and a branch line connected at one end to said branch connection point and terminated at the other end in an energy absorbing resistor.

3. The arrangement claimed in claim 2, the said change in dimensions in each said stub being an abrupt transition from one characteristic impedance to another at a point $$\left(\frac{n_2-1}{4}\right)\lambda_2$$

from the end of each stub remote from its connection to said line section.

4. The arrangement claimed in claim 2, each said stub having uniform dimensions over an electrical length $$\left(\frac{n_2-1}{4}\right)\lambda_2$$

from the end of each stub remote from its connection to said line section, and having different uniform dimensions over the remainder of its length.

References Cited in the file of this patent

UNITED STATES PATENTS

| | | |
|---|---|---|
| 2,128,400 | Carter | Aug. 30, 1938 |
| 2,421,033 | Mason | May 27, 1947 |
| 2,426,633 | Mason | Sept. 2, 1947 |